US012811689B2

(12) United States Patent
Wang et al.

(10) Patent No.: US 12,811,689 B2
(45) Date of Patent: Nov. 24, 2026

(54) TRANSMITTER SHIELDING FOR OPTICAL TRANSCEIVERS

(71) Applicant: Lumentum Technology UK Limited, Northamptonshire (GB)

(72) Inventors: Jian Wang, San Jose, CA (US); Mustafa Al-Qadi, San Jose, CA (US); Wen-Jr Jiang, Milpitas, CA (US); Jibin Sun, San Jose, CA (US)

(73) Assignee: Lumentum Technology UK Limited, Northamptonshire (GB)

( * ) Notice: Subject to any disclaimer, the term of this patent is extended or adjusted under 35 U.S.C. 154(b) by 217 days.

(21) Appl. No.: 18/744,054

(22) Filed: Jun. 14, 2024

(65) Prior Publication Data

US 2025/0260491 A1 Aug. 14, 2025

Related U.S. Application Data

(60) Provisional application No. 63/551,320, filed on Feb. 8, 2024.

(51) Int. Cl.
*H04B 10/40* (2013.01)
*G02B 6/42* (2006.01)
(Continued)

(52) U.S. Cl.
CPC ........... *H04B 10/40* (2013.01); *G02B 6/4238* (2013.01); *G02B 6/4277* (2013.01); *G02B 6/43* (2013.01);
(Continued)

(58) Field of Classification Search
CPC ........... C07K 2319/035; G01N 33/542; G01N 33/587; G01N 33/588; G01N 33/6872;
(Continued)

(56) References Cited

U.S. PATENT DOCUMENTS 10,026,723 B2 * 7/2018 Evans ...................... G02B 6/00
2003/0228081 A1 * 12/2003 Tavlykaev ............ G02F 1/0356 385/3
(Continued)

FOREIGN PATENT DOCUMENTS

EP 4403987 A1 * 7/2024 ........... G02F 1/0356

OTHER PUBLICATIONS

Tu Optical Modulator (Year: 2014).*

*Primary Examiner* — David C Payne
*Assistant Examiner* — Mohammed Abdelraheem
(74) *Attorney, Agent, or Firm* — Harrity & Harrity, LLP

(57) ABSTRACT

In some implementations, an optical communications device includes a silicon photonics (SiP) transceiver with transmitter shielding, comprising: a set of receivers; a set of transmitters with shielding, comprising: a set of drivers; a set of Mach-Zehnder modulators (MZM); a set of ground pours at least partially surrounding the set of MZMs; and a set of bonding wires at least partially surrounding the set of MZMs, wherein the set of ground pours and the set of bonding wires are positioned to electromagnetically confine transmission from each transmitter, of the set of transmitters, wherein the set of ground pours are connected to ground pads of the set of drivers, and wherein the set of ground pours are connected to a ground of the SiP transceiver.

20 Claims, 11 Drawing Sheets

(51) Int. Cl.

| | |
|---|---|
| ***G02B 6/43*** | (2006.01) |
| ***H04B 10/2507*** | (2013.01) |
| ***H04B 10/50*** | (2013.01) |
| ***H04B 10/54*** | (2013.01) |

(52) U.S. Cl.
CPC ..... *H04B 10/2507* (2013.01); *H04B 10/5051* (2013.01); *H04B 10/54* (2013.01)

(58) Field of Classification Search
CPC .. G02B 6/4238; G02B 6/4246; G02B 6/4277; G02B 6/43; H04B 10/2507; H04B 10/40; H04B 10/5051; H04B 10/54
See application file for complete search history.

(56) References Cited

U.S. PATENT DOCUMENTS

| | | | | |
|---|---|---|---|---|
| 2020/0219865 | A1* | 7/2020 | Nelson | G02B 6/4266 |
| 2022/0404680 | A1* | 12/2022 | Jacques | G02F 1/2255 |
| 2024/0149632 | A1* | 5/2024 | Liang | B60G 15/02 |

* cited by examiner

TRANSMITTER SHIELDING FOR OPTICAL TRANSCEIVERS

CROSS-REFERENCE TO RELATED APPLICATION

This Patent Application claims priority to U.S. Provisional Patent Application No. 63/551,320, filed on Feb. 8, 2024, and entitled "TRANSMITTER SHIELDING FOR OPTICAL SYSTEMS." The disclosure of the prior Application is considered part of and is incorporated by reference into this Patent Application.

TECHNICAL FIELD

The present disclosure relates generally to optical communications devices and to transmitter shielding for optical transceivers.

BACKGROUND

Electromagnetic interference (EMI) and crosstalk are sources of noise within a communications system. Radio-frequency (RF) crosstalk occurs, in an optical communications device, when RF power of a first channel is coupled into another channel. For example, transmitter-to-transmitter (Tx-to-Tx) crosstalk occurs when RF power from a first transmitter channel is coupled into a second transmitter channel. Similarly, transmitter-to-receiver (Tx-to-Rx) crosstalk occurs when RF power from a transmitter channel is coupled into a receiver channel. In each case, signal from an interfering channel becomes noise in the interfered channel. A presence of noise in a channel results in a reduced signal-to-noise ratio (SNR) and causes an increase in a bit error rate (BER).

SUMMARY

In some implementations, an optical communications device includes a silicon photonics (SiP) transceiver with transmitter shielding, comprising: a set of receivers; a set of transmitters with shielding, comprising: a set of drivers; a set of Mach-Zehnder modulators (MZM); a set of ground pours at least partially surrounding the set of MZMs; and a set of bonding wires at least partially surrounding the set of MZMs, wherein the set of ground pours and the set of bonding wires are positioned to electromagnetically confine transmission from each transmitter, of the set of transmitters, wherein the set of ground pours are connected to ground pads of the set of drivers, and wherein the set of ground pours are connected to a ground of the SiP transceiver.

In some implementations, an optical communications device includes a SiP transceiver, comprising: a substrate; a photonic integrated circuit (PIC) disposed on the substrate, comprising a set of MZMs; a set of photo-diodes; a driver chip, comprising: a set of drivers; a trans-impedance amplifier (TIA) chip, comprising: a set of TIAs; and a set of micro-bumps connected to the driver chip, wherein the set of micro-bumps is associated with electromagnetically confining transmissions associated with the driver chip. In some implementations, the bonding wires ensure equal electrical potential on the ground pours with which the bonding wires connect.

In some implementations, a transceiver includes a set of MZMs, a set of electromagnetic confinement components at least partially surrounding the set of MZMs, wherein the set of electromagnetic confinement components are positioned to electromagnetically confine a first transmission with respect to a second transmission or a reception, wherein an electromagnetic confinement component, of the set of electromagnetic confinement components, is connected to a ground of the transceiver.

DETAILED DESCRIPTION

Figure 1A:
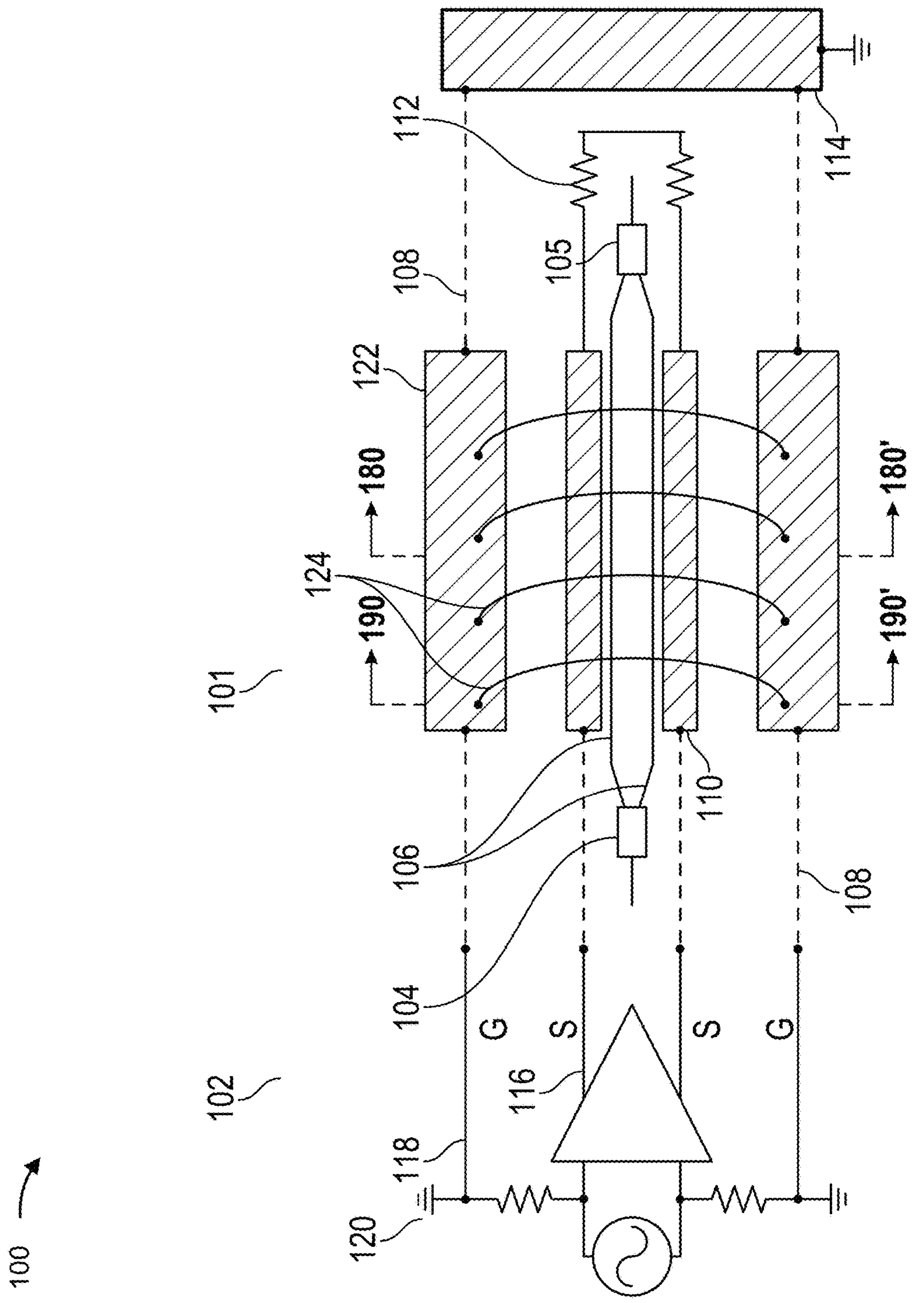
FIGS. 1A-1D are diagrams associated with a single-channel optical transmitter that includes transmitter RF shielding.

The following detailed description of example implementations refers to the accompanying drawings. The same reference numbers in different drawings may identify the same or similar elements.

In optical communication systems, multiple transmitter channels and/or receiver channels may be used for transmission of multiple signals and/or reception of multiple signals concurrently. For example, in optical communications, an optical communications device may include one or more transmitters configured to transmit one or more signals and may include one or more receivers configured to receive one or more signals. In some examples, one or more transmitters and one or more receivers may be disposed within a single package of an optical transceiver device. Alternatively, one or more transmitters may be disposed in a first package and one or more receivers may be disposed in a second package, and the first package and the second package may be positioned proximate to each other. With increasing miniaturization of optical systems, channels (e.g., transmitter channels and/or receiver channels) are disposed increasingly closer to one another.

When multiple channels are positioned proximate to each other, electromagnetic interference (EMI) and crosstalk occurs. For example, in transmitter-to-transmitter (Tx-to-Tx) crosstalk, a first transmitter channel induces RF noise in a second transmitter channel. Similarly, in transmitter-to-receiver (Tx-to-Rx) crosstalk, a transmitter channel induces RF noise in a receiver channel. A presence of crosstalk may affect a link margin of an optical communication link. The link margin is determined by the performance of a transmitter and the performance of a receiver in the optical communication link. The receiver performance is evaluated by sensitivity for an intensity modulation direct-detection (IM-DD) transceiver and for a coherent transceiver used in an unamplified link. The receiver performance is evaluated by a required-optical-signal-to-noise-ratio (rOSNR) for a coherent transceiver used in an amplified communication link. A presence of Tx-to-Tx crosstalk reduces the signal-to-noise ratio (SNR) of the transmitted signal. A presence of Tx-to-Rx crosstalk reduces the signal-to-noise ratio of the received signal. In both cases, the RF crosstalk may degrade receiver sensitivity, or receiver's rOSNR performance, among other examples.

Receiver sensitivity, for a coherent silicon photonics (SiP) transceiver used in an unamplified communication link, is determined by its electrical SNR:

$$SNR = \frac{I^2}{\sigma_{Tx-Rx}^2 + \sigma_{Tx-Tx}^2 + \sigma_{IRN}^2 + \sigma_{shot}^2 + \sigma_{RIN}^2 + \cdots}$$

where I represents a signal photo-current and σ represents a noise term, such as a transmitter-to-receiver crosstalk noise $\sigma_{Tx-Rx}$, a transmitter-to-transmitter crosstalk noise $\sigma_{Tx-Tx}$, a TIA input-referred-noise (IRN) $\sigma_{IRN}$, a shot noise $\sigma_{shot}$, or a laser relative intensity noise (RIN) $\sigma_{RIN}$, among other examples. Here, the transmitter-to-receiver crosstalk noise may have a larger value than other noise sources especially for high-baud-rate applications, resulting in the transmitter-to-receiver noise having a greater effect on an upper limit of the SNR.

Because RF crosstalk is a function of proximity between channels (e.g., closer proximity results in higher levels of crosstalk), as optical systems are increasingly miniaturized, crosstalk has increasingly negative effects on system performance. For example, in small-form-factor pluggable transceivers, such as QSFP-DD and OSFP transceivers used in intra-data-center communication or inter-data-center communication, the small distance between transmitter and receiver photonic integrated circuits (PICs) (e.g., which may be monolithically integrated or disposed within a threshold proximity in a package) results in RF crosstalk level higher than that in transceivers of larger form factors (such as CFP and CFP2). Further, because crosstalk is a function of frequency (e.g., RF crosstalk is stronger at higher frequencies), as optical systems using higher baud rates (e.g., 800 gigabits per second (Gbps) and 1.6 terabits per second (Tbps) applications operating at 120 gigabauds (Gbaud)), crosstalk has increasingly negative effects on system performance.

Effects of crosstalk are experienced across material platforms (e.g., SiP, indium phosphide (InP), thin-film lithium niobate (TFLN), or planar lightwave circuit (PLC) platforms). SiP transceivers are widely deployed for intra-data-center and inter-data-center communications as a result of low cost and low power consumption relative to other material platforms. However, relative to other material platforms, SiP transceivers has a lower transmitter electro-optic modulation efficiency, which results in a larger driver swing to achieve a desired transmitter optical power. Such levels of driver swing may result in higher levels of crosstalk. Accordingly, effects of crosstalk may be particularly acute for SiP transceivers. Additionally, relative to other material platforms, a signal responsivity of SiP receivers is lower as a result of higher levels of insertion loss in optical circuitry, which results in lower signal photo-current I values. This results in lower SNR values, which manifests larger effects from RF crosstalk. Further, in monolithically integrated SiP transceivers, modulators and photodiodes are positioned at increasingly high density levels, which results in larger crosstalk levels. Effects of crosstalk is also experienced across modulation formats (e.g., coherent modulation or intensity modulation direct detection (IM-DD)). However, relative to SiP IM-DD transceivers, SiP coherent transceivers suffers from greater levels of sensitivity degradation at the same noise spectral density levels due to their better sensitivity (e.g., smaller decibel (dB) values). Accordingly, it is desirable to reduce crosstalk in many types of optical systems, and, in particular in SiP coherent transceivers.

In a coherent or IM-DD transceiver, an output RF signal from a digital-to-analog converter (DAC) in a digital signal processor (DSP) chip is amplified by a driver before the RF signal is applied to a modulator. The driver may be a stand-alone driver chip or an integrated driver chip within the DSP. A differential voltage swing at the output of the driver is in a range of 2 volts peak-to-peak differential (Vppd) to 5 Vppd for a transceiver operating in a range of 400 Gbps to 1.6 Tbps. Further, a photo-current at a receiver TIA is approximately 1 milliamp (mA). Accordingly, even when a small portion of a transmitter's RF power is captured at the TIA as crosstalk, crosstalk noise is significant relative to the photo-current at the receiver TIA.

Some implementations described herein provide an optical system with one or more electromagnetic confinement components to shield transmitter and to suppress crosstalk, such as Tx-to-Rx crosstalk or Tx-to-Tx crosstalk, among other examples. Some implementations described herein enable reduction of crosstalk by providing transmitter shielding, such as ground pours, bond wires, or micro-bumps, among other examples, disposed in positions around a source of crosstalk (e.g., one transmitter or multiple transmitters) or between the source of crosstalk and a subject of crosstalk (e.g., a receiver, or another transmitter). As a result, some implementations described herein may improve transmitter's and/or receiver's electrical SNR performance and associated link margin for an optical communication link. For example, by electromagnetically confining a source of crosstalk, some implementations described herein may reduce crosstalk in, for example, optical transceivers, such as SiP coherent transceivers among other examples.

FIGS. 1A-1D are diagrams of a single-channel optical transmitter that employs transmitter RF shielding. As shown in FIG. 1A, a single-channel optical transmitter 100 includes a driver 102, a Mack-Zehnder modulator (MZM) 101, a set of interconnects 108, and a package ground 114. The series-push-pull MZM 101 is designed in a coplanar stripline transmission line configuration and is typically fabricated on a SiP photonic integrated circuit (PIC) chip. The MZM 101 includes an optical power splitter 104, two waveguides 106, two signal trace electrodes 110, an optical power combiner 105, and two MZM terminators 112. Additionally, the driver 102 includes two signal (S) traces 116 and a set of grounds (G) 118, which is electrically connected to the package ground of the optical transmitter 100.

In some implementations, the single-channel optical transmitter 100 can be used in a coherent transceiver, or in a IM-DD transceiver. In some implementations, the single-channel optical transmitter 100 may be associated with an amplified optical communications link or an un-amplified optical communications link.

The single-channel optical transmitter 100 includes electromagnetic confinement components positioned to electromagnetically shield its transmission relative to the transmission of another transmitter channel. The modulator 101 includes a set of ground pours 122. Additionally, the modulator 101 includes a set of bonding wires 124. The set of ground pours 122 are disposed parallel to and at least partially surrounding or bracketing the signal trace electrodes 110 of modulator 101, as shown in FIG. 1A. The set of ground pours 122 are electrically connected to the ground pads of the driver 102, and to a ground of the package in which the optical transmitter 100 is disposed, or to another ground associated with the optical transmitter 100.

In some implementations, the set of ground pours 122 and the set of signal trace electrodes 110 may be fabricated at a common metal layer or at different metal layers of the SiP PIC. The set of ground pours 122 and the set of signal trace electrodes 110 is positioned with a threshold spacing. The spacing between a ground pour 122 and its nearest signal trace electrode 110 is larger than the spacing between the two signal trace electrodes 110 within the single-channel optical transmitter 100. In this case, the pair of signal trace electrodes 110 may be associated with a spacing of less than approximately 100 micrometers (μm), and the ground pours 122 may be separated from the signal trace electrodes 110 by a spacing of greater than or equal to approximately 100 μm. This enables the pair of signal trace electrodes 110 are the current return paths for each other, thereby ensuring that the ground pours 122 do not negatively impact performance of signal trace electrodes 110.

The set of bonding wires 124 connect the ground pours 122 within the single-channel transmitter 100 and are disposed above the signal trace electrodes 110. For example, the set of bonding wires 124 cross the signal trace electrodes 110 without being in contact with the signal trace electrodes 110. Although some implementations are described herein in terms of a SiP platform, it is contemplated that implementations described herein may be applicable to other material platforms, such as InP and lithium-niobate transceivers. For example, a set of bonding wires may be disposed above electrodes of another material platform to provide shielding. In some implementations, the set of bonding wires 124 may be disposed along the ground pours 122 with a particular spacing. For example, the set of bonding wires 124 is arranged with a fixed period between each bonding wire 124, such that the magnitude of the period is inversely proportional to the baud-rate of the optical transmitter 100. The set of bonding wires 124 ensures that ground pours 122 maintain equal electrical potential at the same cross-sectional locations along the signal trace electrodes 110 and the RF signal propagation direction.

By providing the ground pours 122 on sides of the signal trace electrodes 110 and the bonding wires 124 above the signal trace electrodes 110, the optical transmitter 100 confines a transmission being conveyed through the electrodes 110 relative to other transmissions being conveyed through other transmitter channels, as described in more detail herein. In other words, the ground pours 122 and the bonding wires 124 confine electromagnetic fields of RF modulation signals from extending beyond a single-channel transmitter 100 region and toward other transmitter channels or receiver channels. By confining the electromagnetic fields using ground pours 122 and bonding wires 124 rather than other techniques (e.g., RF absorbers), the optical transmitter 100 achieves lower level of Tx-to-Rx RF crosstalk without additional manufacturing processes and/or without increasing a package size.

Figure 1B:
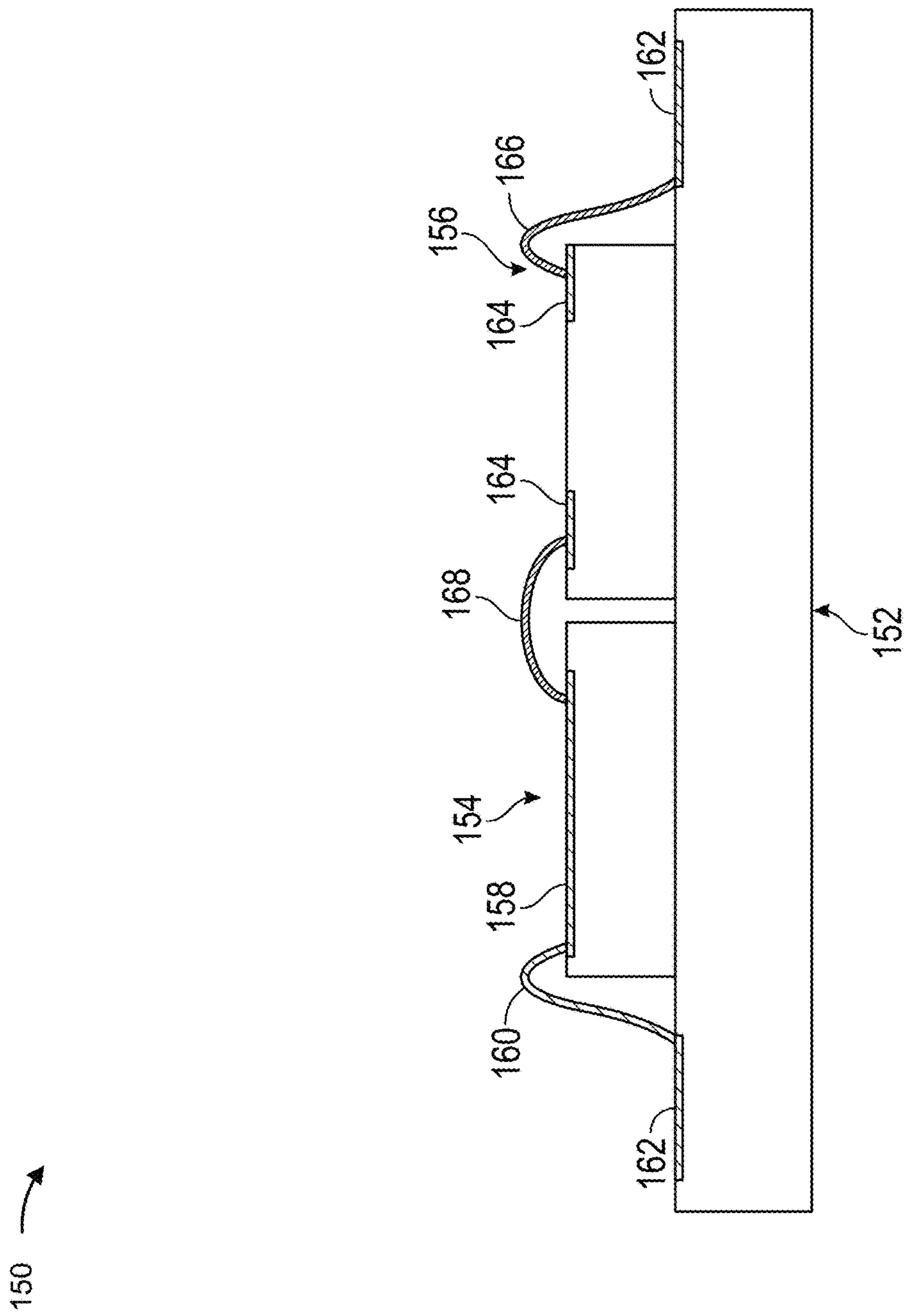

FIG. 1B shows an example transceiver 150 that includes one or more channels of optical transmitter 100 and one or more channels of receivers. The optical transceiver 150 includes a substrate 152, a PIC 154, a driver chip 156 and a TIA chip (not shown). The PIC 154 includes one or more channels of MZM 101, ground pours 158 surrounding MZMs 101 and bonding wires 160 that connect the ground pours 158 to a ground 162 of the substrate 152. The driver chip 156 includes one or more channels of driver, a set of ground pads 164 and bonding wires 166 that connect the set of ground pads 164 to the ground 162. Bonding wires 168 electrically connect the ground pads 164 on the driver chip 156 with the ground pours 158 of PIC 154. In the example transceiver 150, the PIC 154 and the driver chip 156 are disposed on top of the substrate 152 (e.g., which may be a printed circuit board (PCB)). In some implementations, the PIC 154 and the driver 156 may be attached to the substrate 152 using an epoxy glue, a solder connection, a direct mounting, an indirect mounting (e.g., via an intermediate substrate), or another type of attachment. In some implementations, the PIC 154 may be fabricated on a silicon-on-insulator (SOI) wafer. For example, the PIC 154 may be fabricated on a silicon wafer with a buried silicon dioxide (BOX) layer (e.g., which may be approximately 2 μm to 3 μm thick), as shown in more detail with regard to FIG. 1C.

Figure 1C:
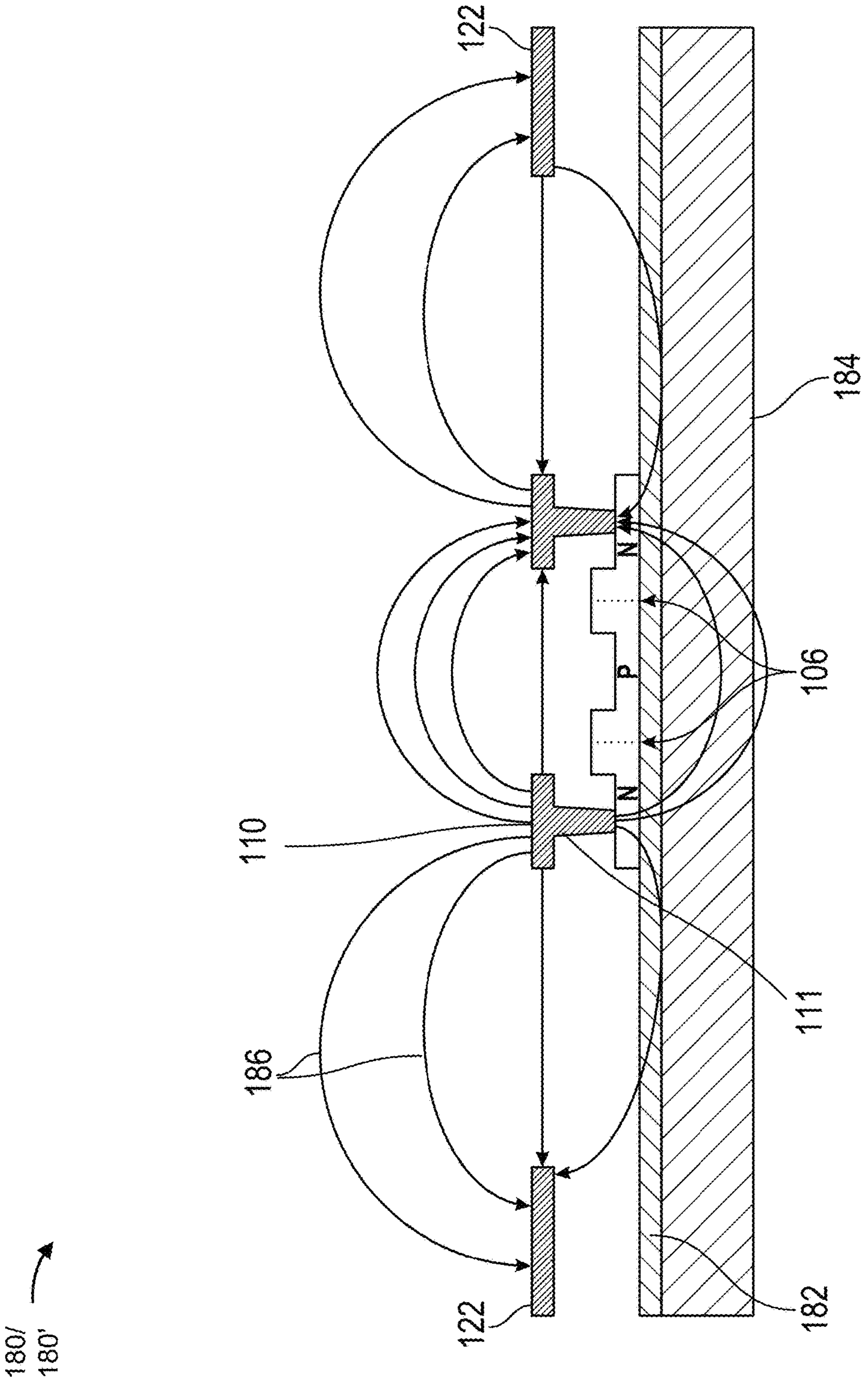

FIG. 1C shows an example 180/180' cross-section of the SiP MZM 101 in the single-channel optical transmitter 100. The example 180/180' illustrates a SiP series-push-pull MZM with lateral metal ground pours. As illustrated with respect to FIG. 1A, the example 180/180' is a cross-section at a position between bonding wires. As shown in the example 180/180', the waveguide 106 is disposed on a buried silicon dioxide layer 182 and a substrate 184. The waveguide 106 includes two silicon rib waveguide with a p-doped silicon section sandwiched by two n-doped silicon sections. In some implementations, the waveguide 106 may include an intrinsic silicon (i) section disposed between an n-doped silicon section and a p-doped silicon section. The signal trace electrodes 110 are connected to doped silicon waveguides through vias 111.

Figure 1D:
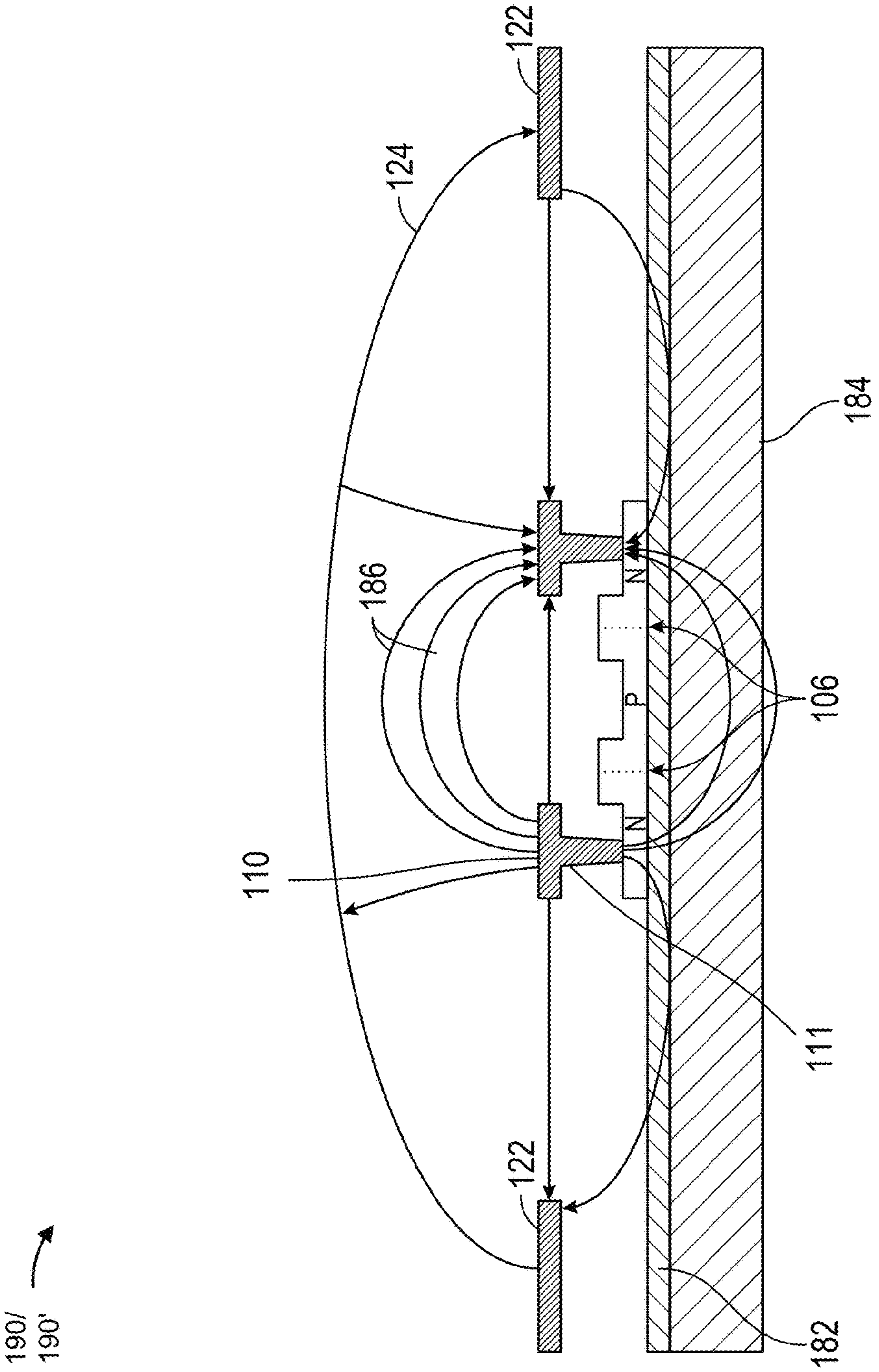

When an RF modulation signal is conveyed through the electrodes 110, electromagnetic field, represented by electromagnetic field lines 186, extends outward from the electrodes 110 (e.g., both upwards away from the substrate 184 and downwards through the buried silicon dioxide layer 182 and the substrate 184). The ground pours 122, being disposed parallel to the waveguide 106, form a confinement structure for the electromagnetic field (e.g., a shielding for the electromagnetic field lines 186). Similarly, FIG. 1D shows an example 190/190' cross-section of the PIC in the optical transmitter 100. As illustrated with respect to FIG. 1A, the example 190/190' is a cross-section at a position of a bonding wire. As shown in the example 190/190', a bonding wire 124, being disposed above the electrodes, ensures equal electrical potential on the ground pours 122 that it connects to. The bonding wire 124 also forms a confinement structure for the electromagnetic field. Accordingly, an amount of electromagnetic field that extends past the ground pours 122 and bonding wires 124 to, for example, another channel, such as another transmitter channel or a receiver channel, is reduced (relative to another configuration in which the ground pours 122 and the bonding wires 124 are not present). By reducing an amount of electromagnetic interference, the optical transmitter 100 achieves reduced crosstalk to its neighboring channels.

As indicated above, FIGS. 1A-1D are provided as an example. Other examples may differ from what is described with regard to FIGS. 1A-1D.

Figure 2A:
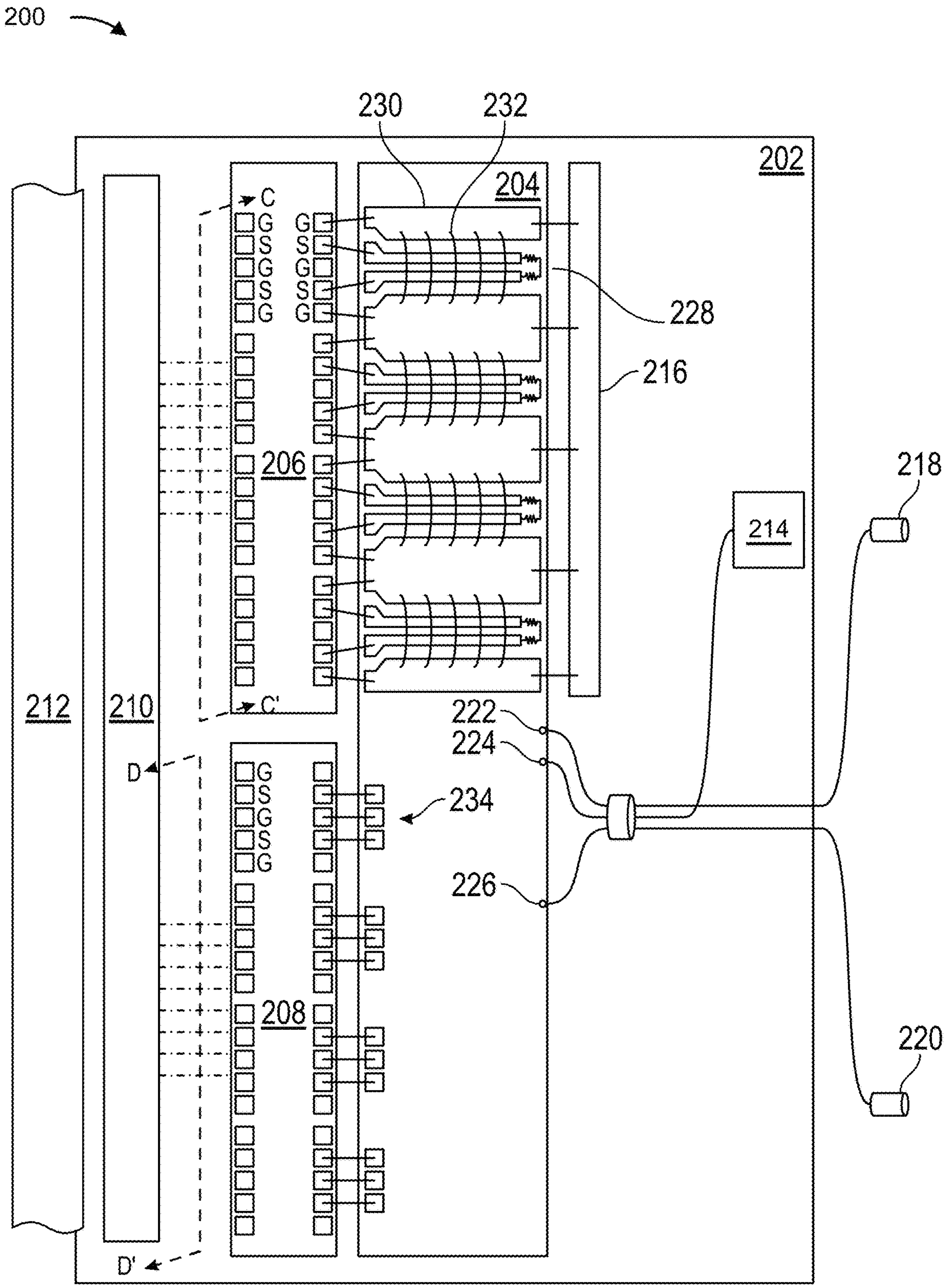
FIGS. 2A-2B are diagrams of a SiP coherent optical transceiver with transmitter shielding.
Figure 2B:
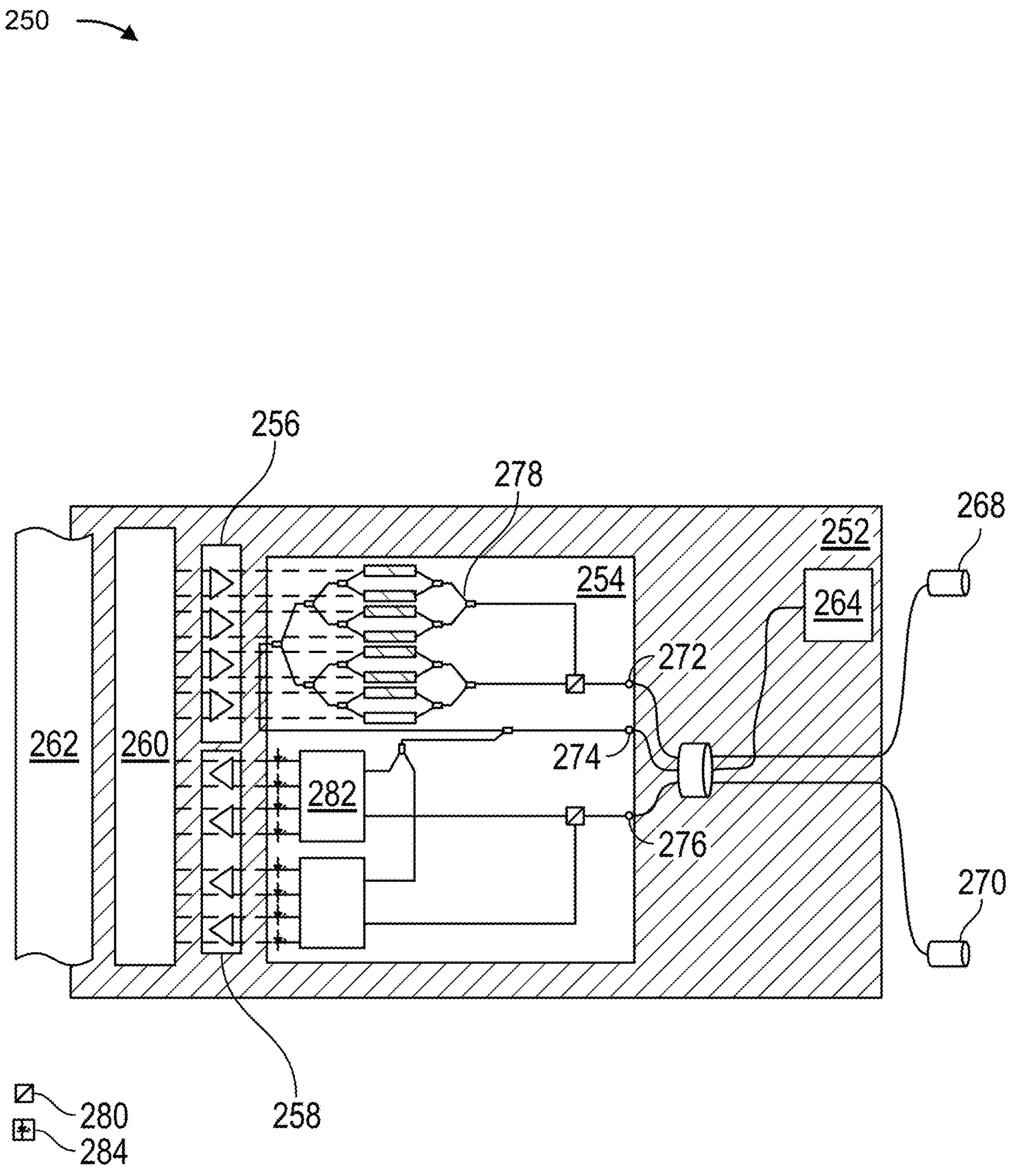

FIGS. 2A-2B are the physical implementation and optical block diagram of a SiP coherent optical transceiver with transmitter shielding.

As shown in FIG. 2A, a coherent optical transceiver 200 (e.g., a SiP transceiver), with transmitter shielding, includes a PCB 202, a PIC 204, a driver chip 206, a TIA chip 208, a DSP chip 210, a set of electrical interfaces 212, a laser 214, a package ground 216, a transmitter output fiber 218, and a receiver input fiber 220. The coherent transceiver 200 in FIG. 2A includes four single-channel transmitters 100 in FIG. 1A.

FIG. 2A illustrates on physical implementation of driver chip 206, PIC 204, and TIA chip 208, with sketches of pads on each chip, bonding wires between chips, electrodes and ground pours of each MZM on the PIC 204, and a ground on the package 206. The PIC 204 includes a transmitter output 222, a laser input 224, a receiver input 226, four MZMs 228 and four differential photodiodes 234. MZM 228 in FIG. 2A may correspond to MZM 101 in FIG. 1A. MZM 228 includes a set of ground pours 230 and a set of bonding wires 232. Each driver channel on the driver chip 206 includes a set of ground pads (G) and a set of signal pads (S), in a GSGSG pad configuration at both its input and its output, that connects to a corresponding modulator via bonding wires. The PIC 204 also includes four differential photodiodes 234. Each photodiode 234 connects, via bonding wires, to one channel of TIA on the TIA chip 208.

FIG. 2B is the optical block diagram of a SiP coherent optical transceiver 250. The transceiver 250 in FIG. 2B corresponds to the transceiver 200 in FIG. 2A. Transceiver 250 includes a PCB 252, a PIC 254, a set of drivers 256, a set of TIAs 258, a DSP 260, a set of electrical interfaces 262, a laser 264, a transmitter output fiber 268, and a receiver input fiber 270. The PIC 254 includes a transmitter output 272, a laser input 274, a receiver input 276, and four MZMs forming two I-Q modulators 278. The two I-Q modulators 278 are combined at a polarization rotator/combiner 280 to form a dual-polarization I-Q modulator. The PIC 204 also includes two optical hybrids 282 associated with 4 differential photodiodes 284. The dual-polarization receiver input is first split by a polarization splitter and rotator, and then feed into two optical hybrids 282.

As indicated above, FIGS. 2A-2B are provided as an example. Other examples may differ from what is described with regard to FIGS. 2A-2B.

Figure 3A:
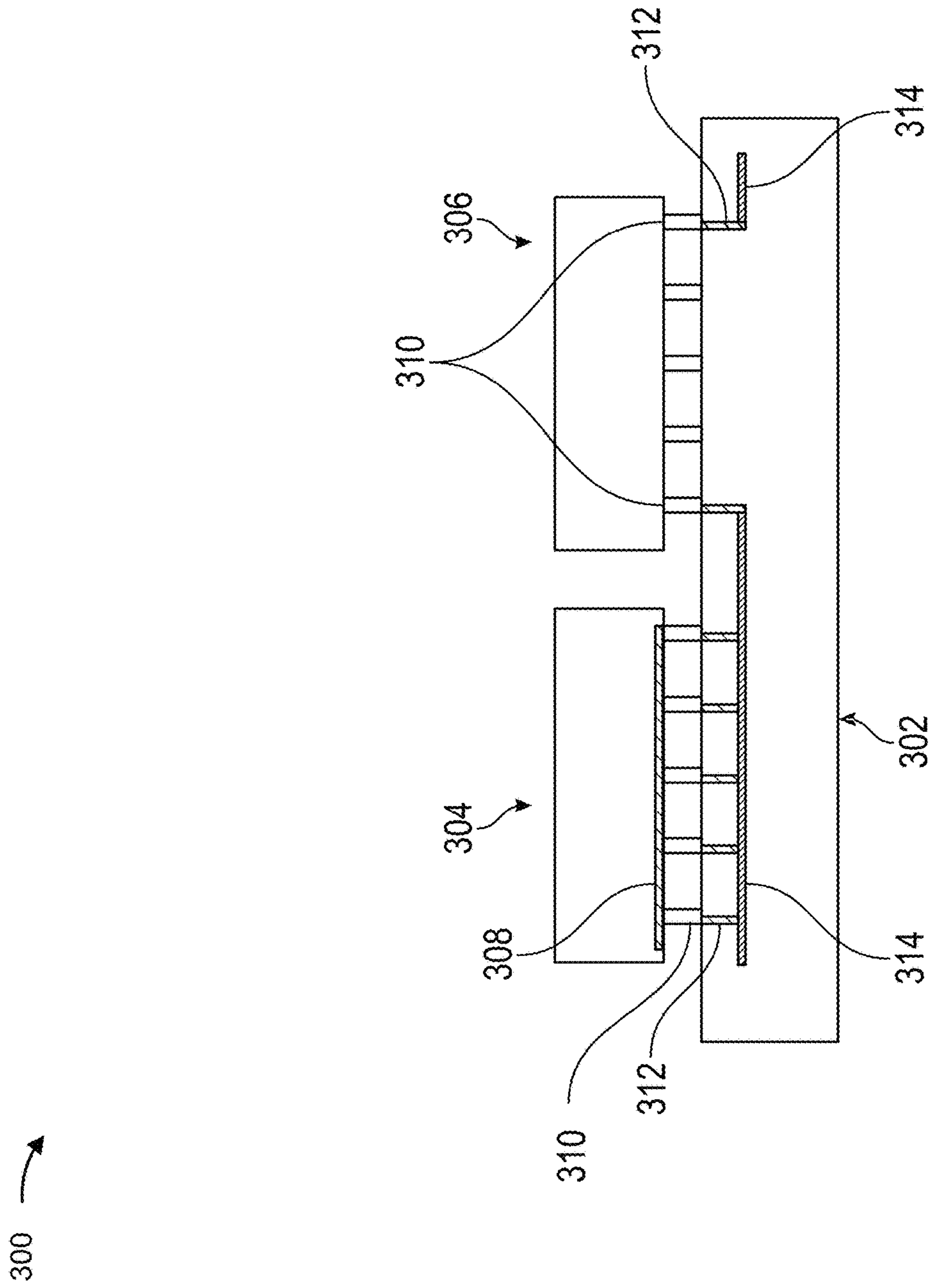
FIGS. 3A-3C are diagrams of transmitter shielding in optical transceivers in 2.5D or 3D packaging architectures.
Figure 3B:
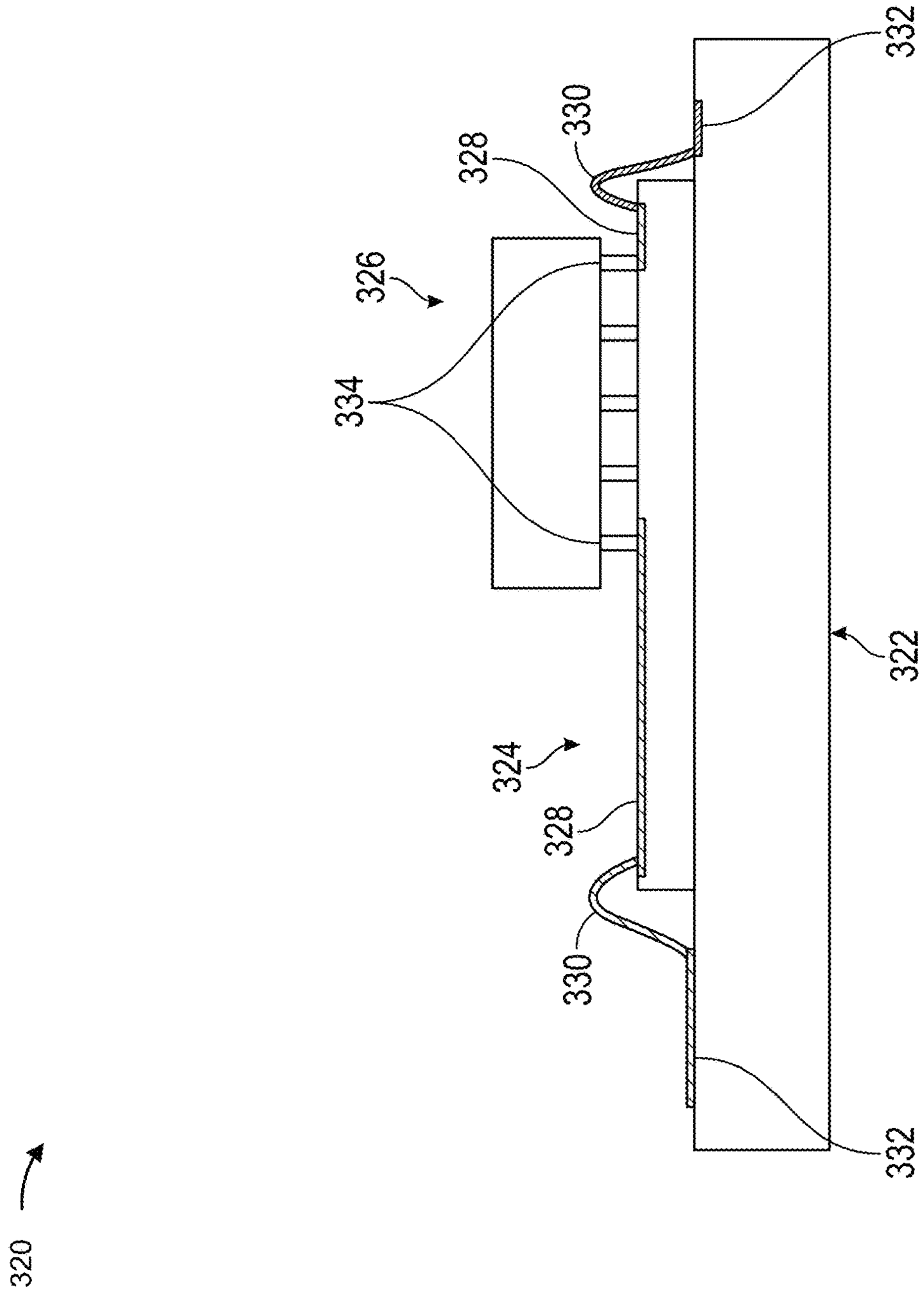
Figure 3C:
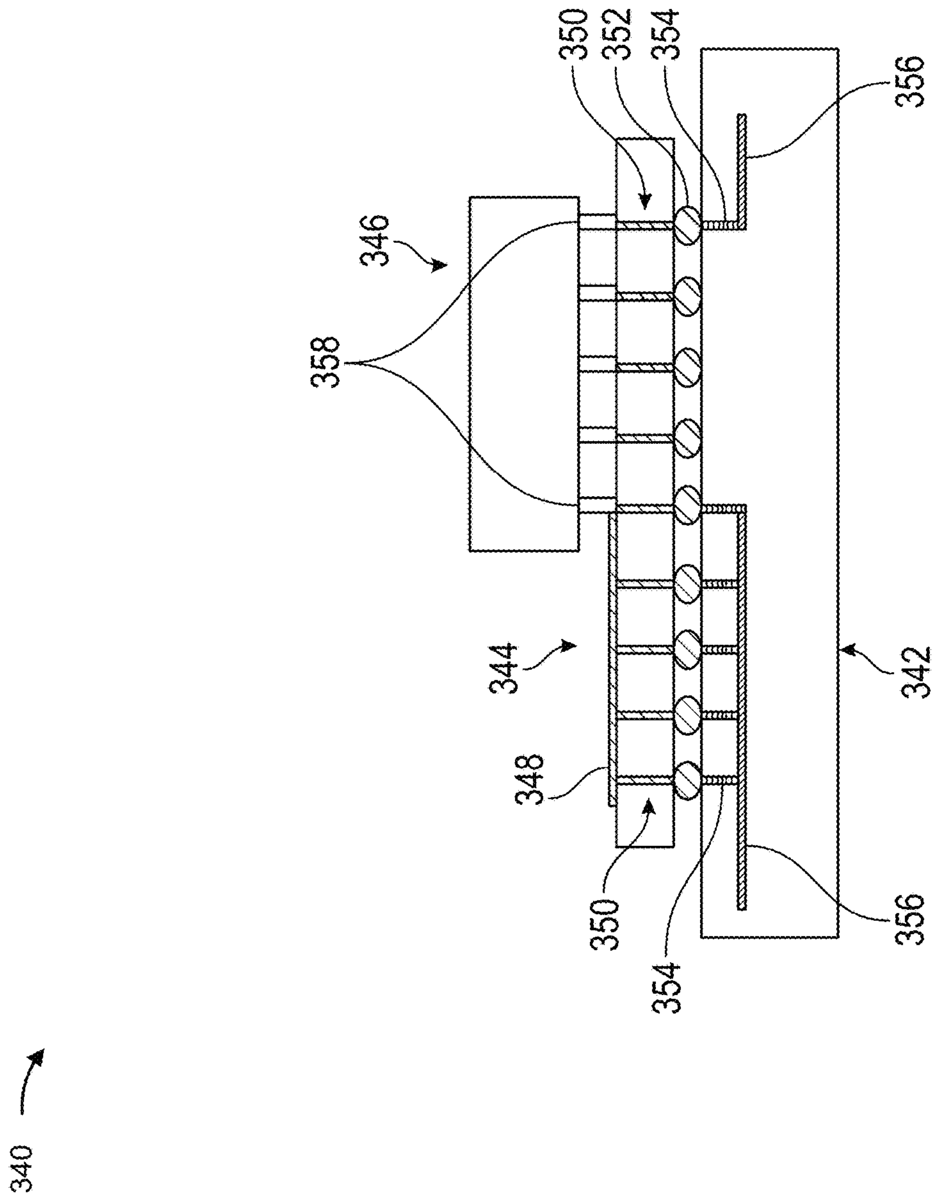

FIGS. 3A-3C are diagrams associated with transmitter shielding in optical transceivers in 2.5D or 3D packaging architectures.

As shown in FIG. 3A, an optical communications device 300 of a flip-chip bonding packaging configuration with a 2.5D architecture (e.g., discrete chips bonding on a common substrate). As further shown in FIG. 3A, the optical communications device 300 includes a substrate 302 (e.g., a PCB or an organic substrate), a PIC 304, a driver chip 306 and a TIA chip (not shown). The PIC 304 includes a set of ground pours 308 that are electrically connected to a set of micro-bumps 310. The micro-bumps 310 and a set of vias 312 electrically connect the ground pours 308 to a ground 314 of the substrate 302. In some implementations, the micro-bumps 310 may be a set of copper pillar micro-bumps grown on the PIC 304 and are soldered to the pads on the substrate 302 through a reflow process. Similarly, at the driver chip 306, the set of micro-bumps 310 and the set of vias 312 connect the ground pads of driver chip 306 to the ground 314 of the substrate 302. The ground pours 308, micro-bumps 310, vias 312, together with the ground plane 314 on the substrate provide transmitter shielding. By disposing a set of micro-bumps 310 (e.g., in a grid or other rectangular or non-rectangular arrangement) between the driver chip 306 and the substrate 302 and/or between the PIC 304 and the substrate 302, the set of micro-bumps 310 enables equal electrical potential on ground pours 308 and ground plane 314.

As shown in FIG. 3B, an optical communications device 320 of a flip-chip bonding packaging configuration with a 3D architecture (e.g., two or more chips stacked and interconnected without a common substrate). As further shown in FIG. 3B, the optical communications device 320 includes a substrate 322 (e.g., a PCB or an organic substrate), a PIC 324, a driver chip 326, and a TIA chip (not shown). The PIC 324 includes a set of ground pours 328 that are electrically connected to a ground 332 of the substrate 322 by bonding wires 330. The driver chip 326 is electrically connected to the PIC 324 via a set of micro-bumps 334. For a ground connection between driver chip 326 and PIC 324, the micro-bumps 334 are disposed on the ground pours 328 on the PIC 324. The bonding wires 330 form a set of direct current (DC) and RF interconnects between the PIC 324 and the substrate 322. Additionally, the bonding wires 330 connect ground pours 328 with the ground 332 and connect each ground pour 328 to ensure that all ground pours 328 remain equal electrical potential. The bonding wires 330 connecting neighboring ground pours also provide crosstalk shielding, as described above.

As shown in FIG. 3C, an optical communications device 340 of a flip-chip bonding SiP packaging configuration with a 3D architecture. As shown in FIG. 3C, an optical communications device 340 includes a substrate 342, a PIC 344, a driver chip 346, and a TIA chip (not shown). The PIC 344 includes a set of ground pours 348 (e.g., a first electromagnetic confinement component) that are electrically connected, by a set of through silicon vias (TSVs) 350, to a set of micro-bumps 352. The micro-bumps 352 are connected, by a set of vias 354 to a ground 356 (e.g., a ground plane forming a second electromagnetic confinement component) of the substrate 342. The grounds of driver chip 346 is connected, by the set of copper pillar micro-bumps 358, the set of TSVs 350, the set of micro-bumps 352, and the set of vias 354, to the ground 356 of the substrate. A redistribution layer (RDL) is grown on a bottom surface of the PIC 344 and it is between TSV 350 and micro-bumps 354.

As indicated above, FIGS. 3A-3C are provided as an example. Other examples may differ from what is described with regard to FIGS. 3A-3C.

Figure 4A:
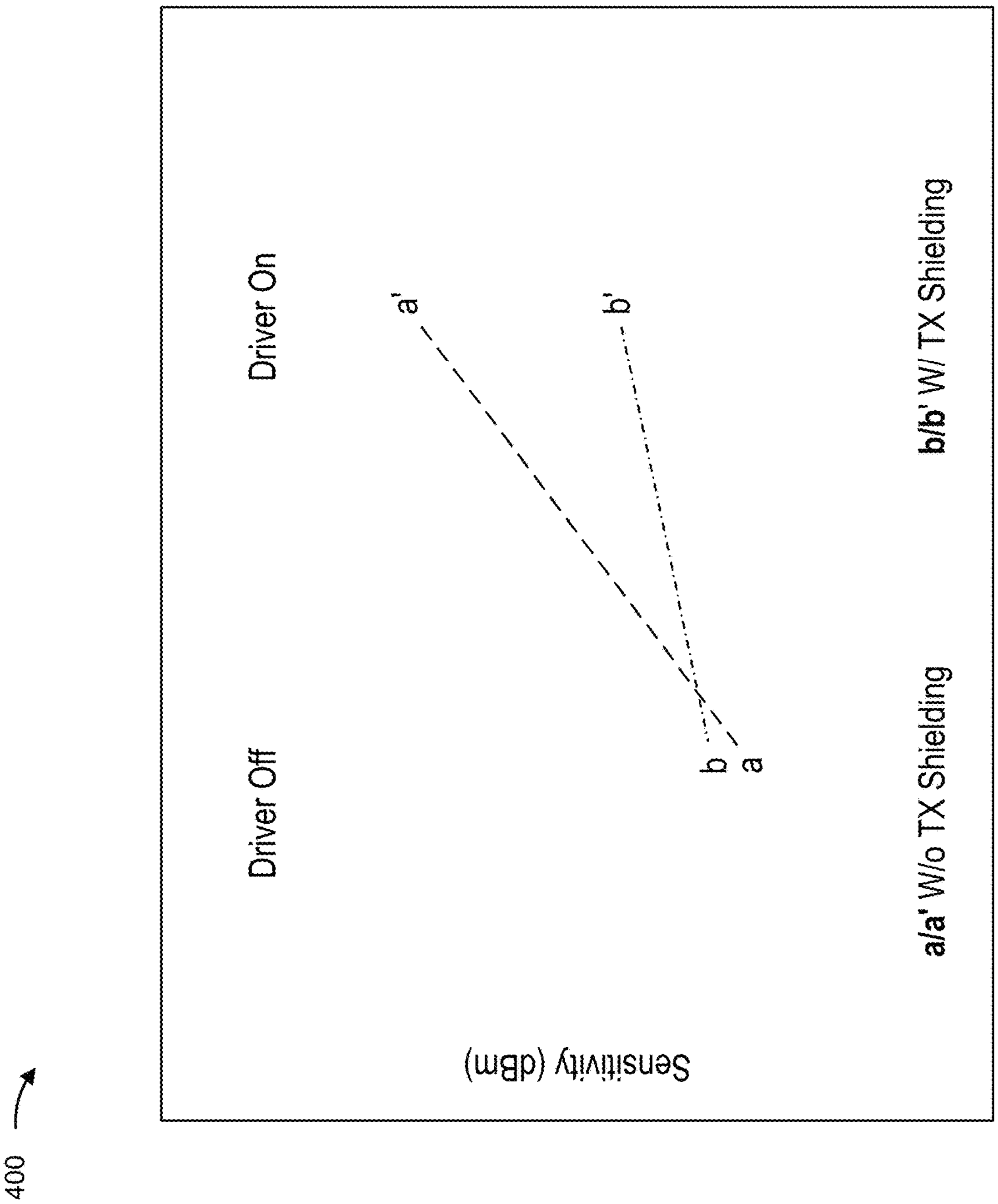
FIGS. 4A-4B are diagrams associated with transmitter shielding method.
Figure 4B:
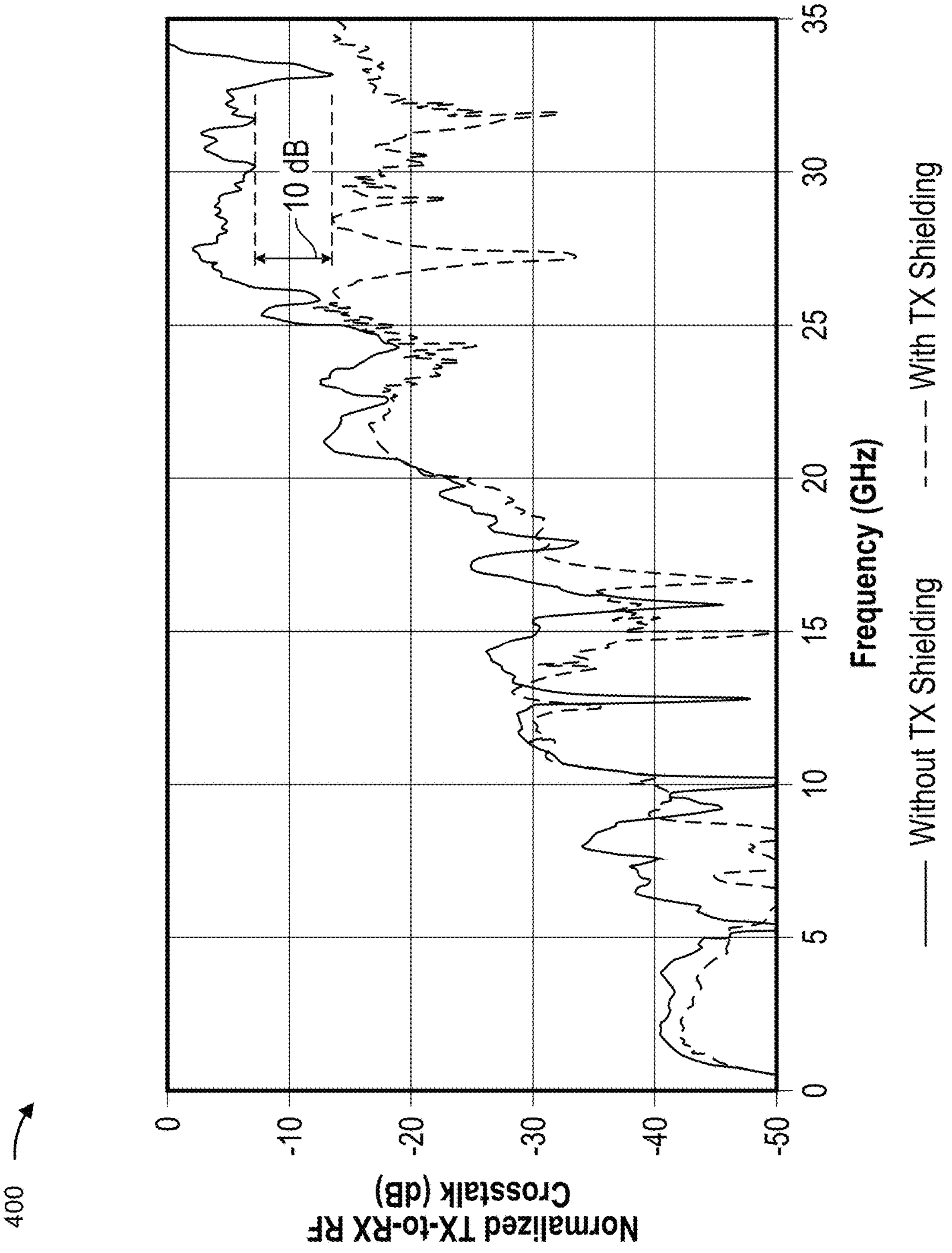

FIGS. 4A-4B shows a reduced Tx-to-Rx RF crosstalk level and improved transceiver sensitivity measured from SiP coherent transceivers employing Tx RF shielding method.

FIG. 4A shows an example diagram 400 indicating a receiver sensitivity of a SiP coherent transceiver described herein. As shown in FIG. 4A and by indicator a/a', for an optical communications device without transmitter shielding, such as the SiP coherent optical transceiver without transmitter shielding, a level of receiver sensitivity decreases when the drivers inside the transceiver are turned on. In contrast, as shown by indictor b/b', for an optical communications device with transmitter shielding, such as the coherent optical transceiver 200 shown in FIG. 2A, the amount by which the level of receiver sensitivity decreases, when the drivers inside the transceiver are turned on, is reduced relative to an optical communications device without transmitter shielding. For example, a degradation of receiver sensitivity, due to transmitter-to-receiver crosstalk when the drivers are turned on, is approximately 2.2 decibels (dB) for a coherent optical transceiver without Tx shielding and less than 0.6 dB for the coherent optical transceiver 200 with Tx shielding. Accordingly, transmitter shielding results in an improvement of approximately 1.6 dB in receiver sensitivity, in one example.

FIG. 4B shows an example of transmitter-to-receiver crosstalk with respect to frequency for a SiP coherent optical transceiver 200. The RF crosstalk measurement is performed at reference indication cross-sections C-C' and D-D', shown in FIG. 2A, i.e., cross-sections inside the SiP coherent transceiver 200 in FIG. 2A. In the RF crosstalk measurement, the RF input is applied at the C-C' cross-section before the driver chip, and the RF output is collected at the D-D' cross-section after the TIA chip. The RF input at C-C' is amplified by the driver chip 206 and applied to the modulators 228 to produce modulated optical signals, which eventually goes to the transmitter output fiber 218 of transceiver 200 in FIG. 2A. Due to the RF crosstalk, some portion of the amplification of the RF input by the driver chip 206 and some portion of the amplified RF input propagating on the modulators 228 is captured by the high-speed photodiodes 234 and TIAs 208. This is the RF crosstalk noise term $\sigma_{Tx\text{-}Rx}$, as described above. The transmitter-to-receiver RF crosstalk is therefore defined as the ratio of the RF output at D-D' to the RF input at C-C'. In FIG. 4B, the crosstalk is normalized to 0 dB at approximately 33 GHz. In the coherent optical transceiver 200, having Tx RF shielding leads to a crosstalk reduction, relative to the case without Tx RF shielding, of approximately 10 dB at a frequency of approximately 30 GHz. Based on crosstalk scaling with respect to frequency (e.g., a level of crosstalk increases as frequency increases), some implementations described herein may ensure that the improvement on receiver's sensitivity or rOSNR performance due to Tx shielding becomes more significant for a transceiver operated at a higher frequency (and higher baud rate, such as 128 Gbaud among other examples). For example, for optical communications devices operating at 128-Gbaud (e.g., a double baud rate of one or more coherent transceivers described herein), the optical communications devices without shielding may exceed 2.2-dB sensitivity penalty, and may gain more than 1.6 dB sensitivity improvement when transmitter shielding is adopted, as described herein.

As indicated above, FIGS. 4A-4B are provided as an example. Other examples may differ from what is described with regards to FIGS. 4A-4B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical communications device, comprising:
- a silicon photonics (SiP) transceiver, comprising:
  - a set of receivers;
  - a set of transmitters, comprising:
    - a set of drivers;
    - a set of Mach-Zehnder modulators (MZM) comprising a set of electrodes that are configured to define both forward and return current paths;
    - a set of ground pours at least partially surrounding the set of MZMs; and
    - a set of bonding wires at least partially surrounding the set of MZMs,
      - wherein the set of ground pours and the set of bonding wires are positioned to electromagnetically confine transmission from each transmitter, of the set of transmitters,
      - wherein the set of bonding wires are disposed over the set of electrodes and connect the set of ground pours, creating an electromagnetic shield together,
      - wherein the set of ground pours are connected to ground pads of the set of drivers, and
      - wherein the set of ground pours are connected to a ground of the SiP transceiver.

2. The optical communications device of claim 1, wherein the SiP transceiver includes at least one of:
- a coherent transceiver for an un-amplified optical communication link,
- a coherent transceiver for an amplified optical communication link,
- an intensity modulation direct detection (IM-DD) transceiver for an un-amplified optical communication link, or
- an intensity modulation direct detection (IM-DD) transceiver for an amplified optical communication link.

3. The optical communications device of claim 1, wherein the set of ground pours and the set of bonding wires are positioned to electromagnetically shield transmission from each transmitter, of the set of transmitters, relative to another transmission from another transmitter, of the set of transmitters, or relative to a reception by a receiver, of the set of receivers.

4. The optical communications device of claim 1, wherein the set of bonding wires connect adjacent ground pours of the set of ground pours on a photonic integrated circuit.

5. The optical communications device of claim 1, wherein the set of bonding wires are connected to ground pads of each driver, of the set of drivers.

6. The optical communications device of claim 1, wherein a transmitter, of the set of transmitters, is associated with at least one of:

a driver, a set of interconnects, or an MZM of the set of MZMs.

7. The optical communications device of claim 1, wherein a receiver, of the set of receivers, is associated with at least one of:

a transimpedance amplifier, a set of interconnects, or a differential high-speed photodiode of a set of differential high-speed photo-diodes.

8. The optical communications device of claim 1, wherein the ground pours at least partially cover or bracket each MZM, of the set of MZMs, associated with a transmitter, of the set of transmitters.

9. The optical communications device of claim 1, wherein a bonding wire, of the set of bonding wires, of a transmitter, of the set of transmitters, connects a first ground pour, of the set of ground pours, to a second ground pour, of the set of ground pours, wherein the bonding wire crosses, without touching, a set of signal traces, and wherein the set of signal traces is disposed between the first ground pour and the second ground pour.

10. The optical communications device of claim 1, wherein the set of bonding wires includes:

a first subset of bonding wires connecting the set of ground pours to ground pads of a driver, of the set of drivers, a second subset of bonding wires connecting adjacent ground pours of the set of ground pours, and a third subset of bonding wires connecting the set of ground pours to a ground on a package or a transceiver.

11. The optical communications device of claim 1, wherein the set of ground pours and the set of bonding wires suppress crosstalk between transmissions of the transmitters or between the transmitters and the receivers at a configured frequency range.

12. An optical communications device, comprising:

a silicon photonics (SiP) transceiver, comprising:

a substrate;

a photonic integrated circuit (PIC) disposed on the substrate, comprising:

a set of Mach-Zehnder modulators (MZMs);

a set of photo-diodes; and a set of ground pours;

a driver chip, comprising a set of drivers;

a trans-impedance amplifier (TIA) chip, comprising a set of TIA; and a set of micro-bumps connected to the driver chip, wherein the set of ground pours are connected to ground pads of the set of drivers on the driver chip, wherein the set of micro-bumps is associated with electromagnetically confining transmissions associated with the driver chip, and wherein the set of micro-bumps and the set of ground pours create an electromagnetic shield together.

13. The optical communications device of claim 12, wherein the driver chip is disposed on the substrate, and wherein the set of micro-bumps is disposed between a driver circuit and the substrate.

14. The optical communications device of claim 12, wherein the driver chip is disposed on the PIC, and wherein the set of micro-bumps is disposed between a driver circuit and the PIC.

15. The optical communications device of claim 12, wherein the set of micro-bumps includes a set of copper pillar micro-bumps.

16. The optical communications device of claim 12, wherein the set of ground pours is associated with electromagnetically confining the transmissions associated with the set of MZMs, and is associated with the driver chip.

17. The optical communications device of claim 12, further comprising:

a ground plane within the substrate, wherein the set of ground pours is connected to the ground plane via at least one of:

one or more bonding wires, one or more copper pillars, one or more through-silicon vias (TSVs), or the set of micro-bumps.

18. A transceiver, comprising:

a set of Mach-Zehnder modulators (MZMs) configured to provide forward and return current paths; and a set of electromagnetic confinement components at least partially surrounding the set of MZMs, wherein the set of electromagnetic confinement components includes a set of ground pours and a set of micro-bumps, wherein the set of electromagnetic confinement components are positioned to electromagnetically confine a first transmission with respect to a second transmission or a reception, wherein the set of micro-bumps and the set of ground pours create an electromagnetic shield together, and wherein an electromagnetic confinement component, of the set of electromagnetic confinement components, is connected to a ground of the transceiver.

19. The transceiver of claim 18, wherein the set of electromagnetic confinement components further includes at least one of:

a ground pour, of the set of ground pours, disposed on a photonic integrated circuit (PIC), a ground plane on a substrate, a through-silicon via (TSV) on the PIC, or a via in the substrate.

20. The transceiver of claim 18, wherein the set of electromagnetic confinement components are disposed above or adjacent to the MZM, of the set of MZMs.

* * * * *